United States Patent [19]
Toyama et al.

[11] Patent Number: 4,592,293
[45] Date of Patent: Jun. 3, 1986

[54] METHOD OF CONTROLLING AN AIR HEATER OF A COAL-FIRED BOILER

[75] Inventors: Eiji Toyama, Hitachi; Akira Sugano, Katsuta, both of Japan

[73] Assignee: Hitachi, Ltd., Tokyo, Japan

[21] Appl. No.: 669,799

[22] Filed: Nov. 9, 1984

[30] Foreign Application Priority Data

Nov. 14, 1983 [JP] Japan .................................. 58-213852

[51] Int. Cl.$^4$ .............................................. F23D 1/00
[52] U.S. Cl. ..................................... 110/347; 110/106; 110/232; 122/1 A
[58] Field of Search ................... 122/1 A, 1 C, 479 A, 122/479 D; 110/347, 106, 232

[56] References Cited

U.S. PATENT DOCUMENTS

| | | | |
|---|---|---|---|
| 2,582,830 | 1/1952 | Hawley | 122/1 A |
| 2,744,733 | 5/1956 | Howes | 122/1 A |
| 2,795,213 | 6/1957 | Cooper | 122/1 A |
| 3,246,635 | 4/1966 | Powell | 122/479 |
| 3,273,520 | 9/1966 | Hottenstine | 110/347 |
| 3,447,492 | 6/1969 | Kreimann et al. | 110/232 |
| 4,090,455 | 5/1978 | McCartney | 110/232 |
| 4,403,571 | 9/1983 | Kochey, Jr. | 122/1 A |
| 4,442,783 | 4/1984 | Pajonas et al. | 110/347 |
| 4,501,204 | 2/1985 | McCartney et al. | 110/232 |
| 4,552,076 | 11/1985 | McCartney | 110/347 |

Primary Examiner—Henry C. Yuen
Attorney, Agent, or Firm—Antonelli, Terry & Wands

[57] ABSTRACT

A method of controlling an air heater of a coal-fired boiler system comprising an air heater for heating a primary air used to dry a pulverized coal and convey it into the boiler and a secondary air to combust the pulverized coal by a heat exchange utilizing the exhaust gas discharged from the boiler as a heat source. The air heater includes a primary air heater and a secondary air heater arranged in parallel and the exhaust gas is introduced therein from the boiler by an induced draft fan with the flow rate of the exhaust gas being introduced into each of the air heaters being controlled by a respective gas damper. The heater primary air is mixed with a cold air to have a suitable temperature to dry and convey the pulverized coal, wherein the opening of the damper for the cold air is maintained at a low value of approximate 0% for maintaining the flow rate of the cold air low, while the suitable temperature is obtained by controlling the gas damper for the primary air heater.

8 Claims, 5 Drawing Figures

METHOD OF CONTROLLING AN AIR HEATER OF A COAL-FIRED BOILER

BACKGROUND OF THE INVENTION

This invention relates to a method of controlling an air heater of a coal-fired boiler and, more particularly, to a method of controlling an air heater of a pulverized-coal fired boiler, which is intended for increasing the plant efficiency thereof.

Coal-fired boilers have been proposed and have been put into practical use for a long time. However, since many of these boilers were of a stocker combustion system requiring the disposal of combustion ashes, were difficult to control, use of such boilers was abandoned and instead oil-fired boilers became popular. However, due to the recent world-wide oil crisis coal-fired boilers have recently gained public attention. Thus, many of the boilers have been presently planned, designed, and constructed as pulverized-coal fired boilers.

In a pulverized-coal fired boiler, small coal pieces, prepared by pulverizing coal by a mill, are supplied into a furnace and are combusted therein; therefore it is necessary that no combustion ash is produced and control of the furnace is facilitated. The pulverized-coal fired boiler differs from other coal-fired boilers or oil-fired boilers in that it requires the use of a conveyance air for conveying the pulverized coal pieces from the mill to itself, in addition to the use of a combustion air. The at least two air supply systems are required with, one air supplying system supplying the conveyance air, generally called "primary air supplying system", and the other air supplying system supplying the combustion air, generally called "secondary air supplying system". A hot air, prepared by heating the atmospheric air, is used as the air to be supplied to boiler. If a cold air is supplied to the boiler as the combustion air, the boiler interior is cooled so that it is not possible to obtain a highly efficient combustion. Further, in order to convey the pulverized coal pieces by the primary air with high efficiency for combustion thereof, it is necessary that the content of water in the pulverized coal pieces is zero. The hot air is prepared with the use of an air heater which is so arranged as to effect a heat exchange between the atmospheric air and an exhaust gas of the boiler.

In, for example, U.S. Pat. No. 3,246,635, a pulverized-coal fired boiler is prepared having an air supplying system and, as shown in its FIG. 5, the cold air in the first stage, and the hot air in the second stage, of an air heater 9 are supplied into a mill 25 through dampers 26, 34, respectively. Air temperature in the mill 25 is monitored by a temperature sensor 60 so as to prevent an explosion in the mill due to too high air temperature and is adjusted to a predetermined temperature by controlling the openings of the cold and hot air dampers 26 and 34.

According to this known example, the air temperature in the mill is controlled to a predetermined value by controlling the mixing ratio between the primary hot air and the primary cold air. However, the water content in the coal varies widely in dependence upon the type of the coal, and when a coal which is high in water content is used, the air temperature in the mill is decreased, so that the operation is performed under a condition wherein a primary hot air damper is fully opened and a primary cold air damper fully closed. In this case, in order to quickly compensate for a coal with a high water content, it is necessary for the air heater to be sufficiently large so as to enable the primary hot air temperature to be increased. On the other hand, when a low water content coal is used, the operation is performed under conditions wherein the primary cold air damper is almost fully opened and the primary hot air damper almost fully closed. In this case, the air is again cooled, after being heated by the air heater, to a temperature which corresponds to a suitable within-mill air temperature. Therefore, the rate of heat exchange in the air heater is very low and is uneconomical.

An air underlying present invention essentially resides in providing a method of controlling an air heater of a coal-burning type boiler by which it is possible to obtain a necessary temperature of the primary air without employing a large capacity air heater while also effecting a high heat exchange.

In accordance with the control method the invention the flow rate of a cold air is restricted by maintaining a cold air damper, through which the cold air is taken in, almost fully closed, and under this condition to control a gas damper of the air heater so as to obtain a necessary temperature of the primary air after mixtured.

Thus, in accordance with the present invention, the flow rate of the cold air which is taken in is minimized and the flow rate of an exhaust gas into the air heater is increased. Therefore, it is possible to obtain the necessary temperature of the primary air without providing a large capacity air heater. Besides, the rate of heat exchange in the air heater can also be increased, whereby the heat of the exhaust gas can be effectively utilized.

DETAILED DESCRIPTION

Figure 1:
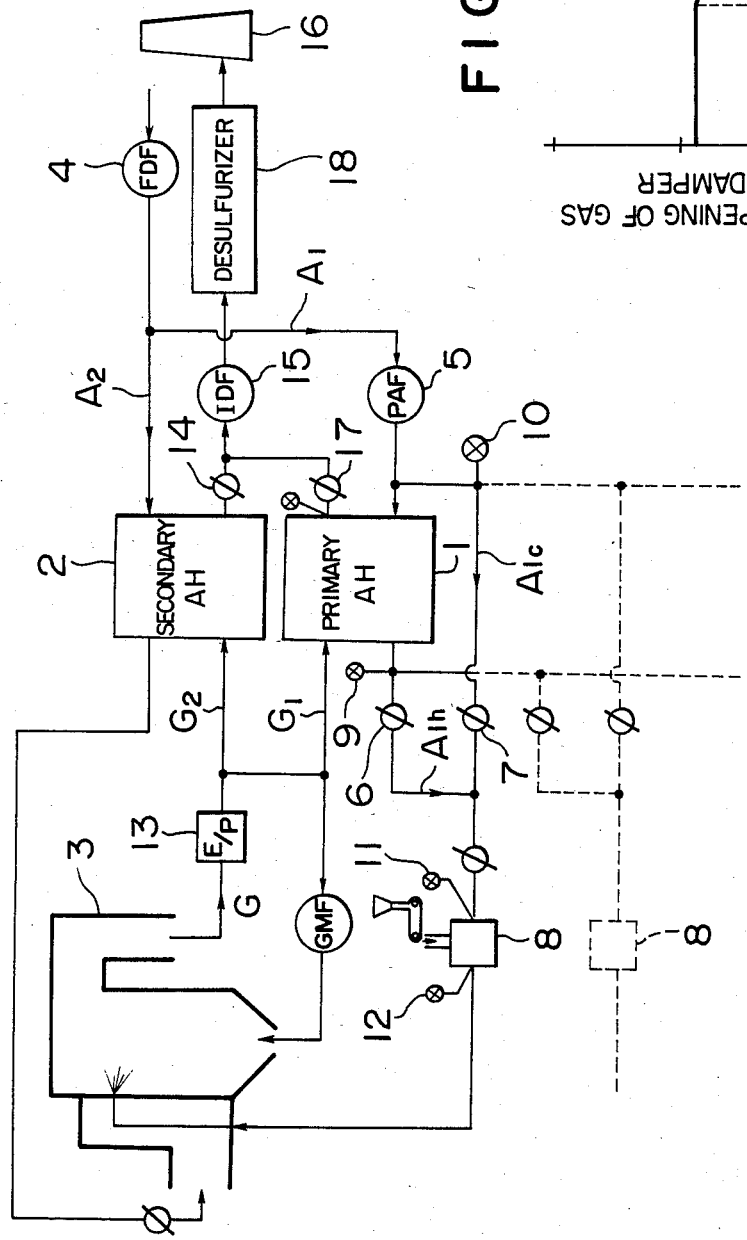
FIG. 1 is a schematic view of a system of an air heater and associated parts of a pulverized-coal fired boiler constructed in accordance with the present invention.

Referring now to the drawings wherein like reference numerals are used throughout the various views to designate like parts and, more particularly, to FIG. 1, according to this figure air heaters 1, 2 for heating the air to be supplied into a boiler 3 of a thermal-power station by using the exhaust or combusted gas discharged from the boiler 3, thereby increased the combustion efficiency thereof. The air to be preheated includes two types one type of which is a primary air used to convey, for example, pulverized into the boiler 3 and the other type is a secondary air used to burn or combust the coal. The primary and secondary air are taken in from outside and respectively forced into the air heaters 1, 2 by a forced draft fan 4. After the forced draft fan 4, the primary air A1 branches away from the secondary air A2 and is accelerated by a primary-air fan 5 to enter the primary-air heater AH1 and heated therein by the exhaust gas to become a heated air A1$h$. Thereafter, the primary air A1$h$ passes through a heated air damper 6 and merges in a cold air A1$c$. The cold air A1$c$ is taken in from outside via a cold air damper 7. By mergence, a mixture of the heated hot air A1$c$ and the cold air A1$c$ has a specified temperature and passes through a mill 8 and serves to dry the coal and, at the same time, convey the coal into the boiler 3. At this time, the temperature of the mixture, i.e., the primary air, is monitored by a temperature sensor 11, whereby the primary air is maintained to have a specified temperature through control of a gas damper 17 of the primary air heater AH1. The temperature of the cold air, the temperature at the outlet of the primary AH, and the temperature at the outlet of the mill are detected by temperature sensors 10, 9, and 12, respectively. In order for the primary air supplied to the mill to sufficiently perform its function to dry and heat the pulverized coal pieces, it is necessary that the temperature at the outlet or inlet of the mill 8 be a specified temperature. Conventionally, in order to maintain the temperature of, for example, the outlet of the mill 8 at specified temperature, control is made in such a manner as to close one of the hot air damper 6 and the cold air damper 7 and open the other.

Of the air which has come out of the forced draft fan 4, the secondary air A2 is heated from the exhaust gas in the secondary air heater AH2 and is supplied into the boiler 3.

On the other hand, the exhaust gas G which has been discharged from the boiler 3, after passing through an electric dust collector 13, is divided into two flows, with one flow G1 being introduced into the primary air heater AH1. After having heated the primary air, the exhaust gas G1 passes through a gas damper 17 and drawn out by an induced draft fan 15, thus being allowed to be discharged from a chimney 16.

Of the exhaust gas which has been divided into two flows, the other exhaust gas G2 is supplied to the secondary air heater AH2 and heats the secondary air A2. Thereafter, it passes through a gas damper 14 and then drawn out by the induced draft fan 15, passing through a desulfurizer 18 or the like to be discharged from the chimney 16. Generally, two or more mill systems are arranged in parallel.

Figure 2:
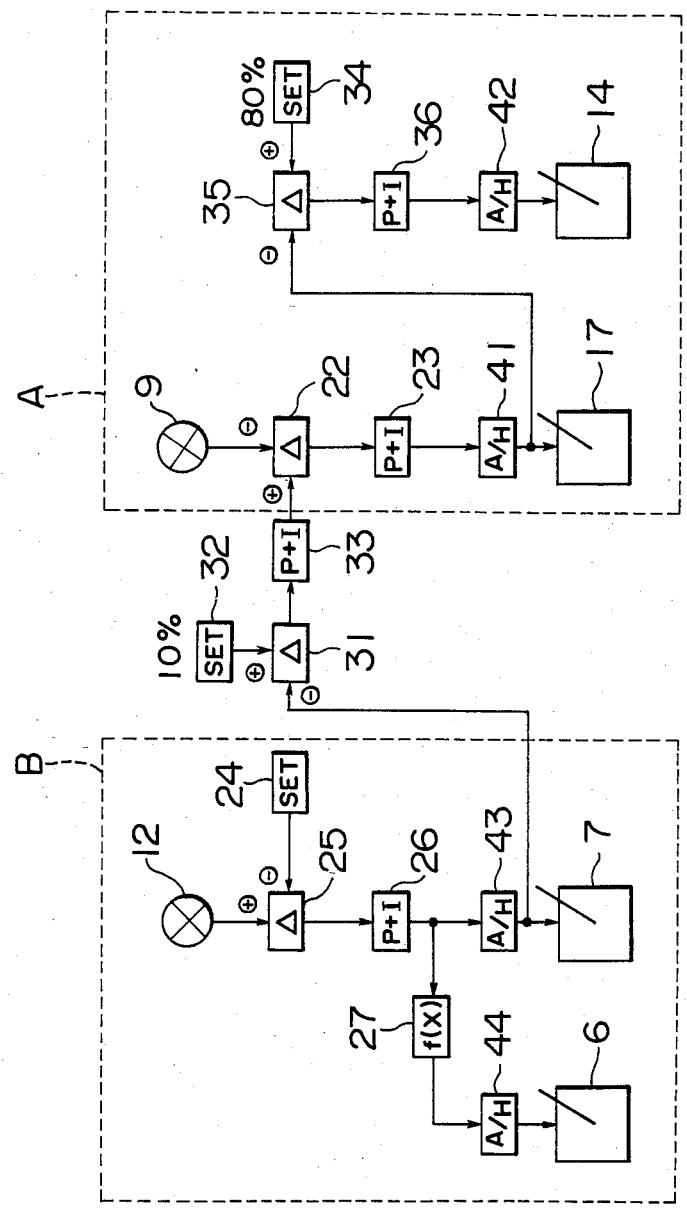
FIG. 2 is a schematic view of a method of controlling the air heater according to the present invention wherein the within-mill air temperature is controlled by a gas damper.

As shown in FIG. 2, a control system A is provided for the gas dampers 14, 17, with a control system B being provided for the air dampers 6, 7. A hot air damper and cold air damper 7 are provided along with a primary gas damper 17 and a secondary gas damper 14.

To explain about the control system for the air dampers, the outlet air temperature of the mill 8 in FIG. 1 is monitored by the sensor 12 and a difference between the outlet temperature and a predetermined temperature of a temperature sensing means 24 is calculated in a subtractor 25, with the calculated difference being supplied to a proportional integrator 26 subjected to a specified arithmetic operation, thus to become a command signal for actuating the air dampers 6, 7. The cold air damper 7 and the hot air damper 6 should are arranged so as to operate in such a manner that, when one damper 6 or 7 is opened, the other damper 6 or 7 is closed. For this reason, the command signal issued from the proportional integrator 26 passes through a function generator 27 and is thereby converted into a command signal indicating an inverse opening, which signal is then supplied into the hot air damper 6. Auto-manual selectors 43, 44 select either a signal from the proportional integrator 26 or a manual signal, not shown.

According to this control system for the air dampers, control is performed such that when the outlet temperature of the mill is higher than a preset temperature by the temperature setting means 24, the cold air damper 7 is opened and the hot air damper 6 is closed. Further, when the outlet temperature of the mill is lower than the preset temperature, the hot air damper 6 is opened and the cold air damper 7 is closed. In the former case, however, since the atmospheric air is again cooled after it has been once heated by the air heater 1, it results in decreased thermal effieincy. Further, in the latter case, when the coal has a high water content, it is necessary that a large capacity air heater be provied.

For the above-mentioned reasons, the present invention is directed to making the openings of the air dampers 6, 7 as constant as possible and instead controlling the opening of the opening of the gas damper so as to control the outlet air temperature of the mill 8. For this reason, the signal indicative of the opening of the cold air damper 7 is sent into a subtractor 31 and is subtracted therein from a predetermined preset opening signal in an opening setting means 32, which corresponds to a nearly closed position of air damper 7 (approximately 10% open, for example). The difference valve obtained is subjected to a specified operation in a proportional integrator 33. The result of this operation is supplied into the control system A to control the opening of the primary gas damper 17 and the secondary gas damper 14. To control the opening of the primary gas damper 17, the output of the proportional integrator 33 provides a signal indicative of a target value to be reached by the output of the outlet temperature sensor 9 of the primary air heater. That is, as the opening of the cold air damper 7 is increased, the target value becomes smaller (i.e., the target value becomes a value which makes the outlet temperature of the primary air heater lower). The difference between the output of the proportional integrator 33 and the output of the temperature sensor 9 is calculated in a subtractor 22 and subjected to operation in a proportional integrator 23, thus to become a signal for actuating the primary gas damper 17. Note here that 41 is an auto-manual selector. Since the opening of the primary gas damper 17 is controlled in the above-mentioned manner, when the output of the proportional integrator 33 is greater than the output of the temperature sensor 9, the opening of the primary gas damper 17 is increased to cause an increase in the outlet air temperature of the primary air heater (i.e., the output of the temperature sensor 9). Further, when the output of the proportional integrator 33 is smaller than the output of the temperature sensor 9, the opening of the primary gas damper 17 is decreased to cause a decrease in the outlet temperature of the primary air heater. As a result, when the outlet temperature of the mill 8 (the output of the temperature sensor 12) becomes greater than the output of the temperature setting means 24 and, consequently, a larger amount of cold air becomes necessary and yet the opening of the cold air damper 7 is greater than 10%, the output of the proportional integrator 33 becomes smaller than the output of the temperature sensor 9, so that the opening of the primary gas damper 17 is decreased. As a result, the outlet temperature of the primary air heater is decreased, and therefore the opening of the cold air damper 7 is decreased. Conversely, when a larger amount of hot air becomes necessary and the opening of the cold air damper 7 is less than 10%, the output of the proportional integrator 33 becomes greater than the output of the temperature sensor 9. As a result, the opening of the primary gas damper 17 is increased and the opening of the cold air damper 7 is increased. As a result, the opening of the cold air damper 7 is maintained to be approximately 10% so that the outlet temperature of the mill is controlled mainly by the primary gas damper 17.

It should be noted here that although it would be more desirable to keep the cold air damper 7 to be fully closed from the standpoint of the heat exchanging efficiency, some margin may be required in order to respond to various operations.

In the embodiment of FIG. 2, the secondary gas damper 14 is further so controlled as to have a specified opening in accordance with the opening of the primary gas damper 17. Namely, the difference between an actual opening of the primary gas damper 17 and the output of an opening setting means 34 provided therefor is calculated in a subtractor 35 and is supplied to the secondary gas damper 14 through a proportional integrator 36 and auto-manual selector 42. The controller A is added for the following reasons. Namely, where the flow rate of the exhaust gas flowing from the boiler into the primary air heater AH1 and secondary air heater AH2 is controlled, the load of the induced draft fan 15 widely varies depending upon gas passage, either the primary air heater AH1 or the secondary air heater AH2. Accordingly, in the above-mentioned embodiment, somewhat apart from the present invention, means are provided to minimize the load of the induced draft fan 15 and to eliminate the necessity of making the induced draft fan large capacity. The load of the induced draft fan 15 is proportional to yhe magnitude of flow loss in the exhaust gas passage. Since the loss in the exhaust gas passage for the secondary air heater AH2 occupies a large proportion as compared with the loss in the exhaust gas passage for the primary air heater AH1, the controller A has been added to minimize the loss in the secondary air heater AH2.

To this end, the controller A is arranged such that the opening of the gas damper 14 of the secondary air heater AH2 is controlled so as to maintain the gas damper 17 to have an opening of approximately 100% (fully opened). More specifically, the opening of the gas damper 17 of the primary air heater AH1 is affected by a flow rate of the exhaust gas into the primary air heater AH1, as well as by a necessary temperature of the primary air. Therefore, by controlling the opening of the gas damper 14 of the secondary air heater AH2, the flow rate of the exhaust gas into the primary air heater AH1 is controlled so as to maintain the gas damper 17 of the primary air heater AH1 to have an opening which is open at approximately 100%. By so doing, it is possible to minimize the flow loss in the exhaust gas passage for the secondary air heater AH2 which occupies a large portion of the total fflow loss.

To explain the above with reference to FIG. 2, a predetermined opening of the primary gas damper 17 is selected an 80% open position, i.e. nearly fully open, and stored in the opening setting means 34. The actual opening of this gas damper 17 is subtracted from the predetermined preset opening of 80% in a subtractor 35 and the result of subtraction is subjected to arithmetic operation in a proportional integrator 36, to become a command signal for opening of the secondary gas damper 14. That is, where the opening of the primary gas damper 17 is less than 80%, the secondary gas damper 14 is opened to cause a decrease in the flow rate of the exhaust gas through the air hater to AH1 thereby control the primary gas damper 17 so as to cause its opening to increase toward 80%. Conversely, where the opening of the primary gas damper 17 is greater than 80%, the secondary gas damper 14 is closed to cause an increase in the flow rate of the exhaust gas through the primary air heater AH1, to thereby control the primary gas damper 17 so as to cause its opening to decrease toward 80%.

The advantage obtained by a control of the secondary gas damper 14 will now be explained with reference to FIG. 3. If only the primary gas damper 17 is controlled with the secondary gas damper 14 maintained at a fixed opening, then the following inconvenience will arise. That is, when, in such a case, the greater the amount of heat required for the primary air due to, for example, an increased water content of the coal, the more fully the primary gas damper 17 must be opened as shown in FIG. 3 by a curve (1) at a relatively lower supply rate of coal, (which, where the coal-fired boiler is one for an electric generator, is proportional to the load of the generator) and no necessary amount of heat can be obtained when the load is further increased.

Figure 3:
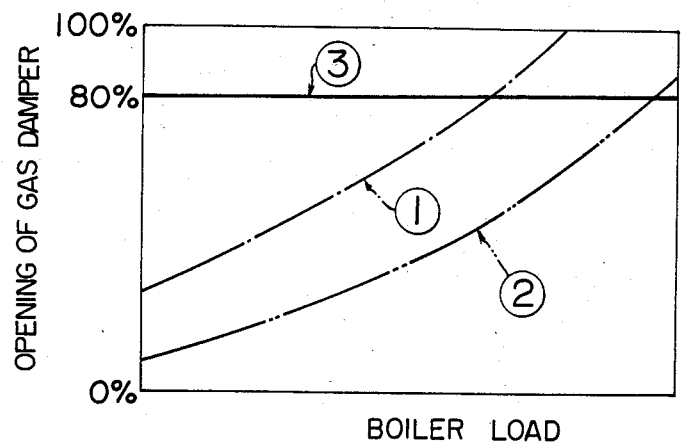
FIG. 3 is a graphical illustration of the effect of the present invention obtained with a construction such as shown in FIG. 2.

To overcome such a disadvantage, if the exhaust gas passage of the secondary air heater AH2 is made narrower, the flow rate of the exhaust gas through the primary air heater AH1 may be certainly increased, and the above-mentioned problem in the region of high load is solved as shown in FIG. 3 by a curve (2). In this case, however, the heat exchanging rate in the primary air heater AH1 is decreased in the region of low load.

In contrast, if the secondary gas damper 14 is controlled as seen in the above embodiment, the control in this case is made as shown in FIG. 3 by a line (3) so that the primary gas damper 17 may be maintained at all times to have an opening (80%), i.e., fully opened, and not only a necessary amount of heat for the primary air can be obtained even in the region of high load, but also the heat exchanging rate in the primary air heater AH1 is prevented from decreasing even in the region of low load. At the same time, it is possible to minimize the flow loss in the exhaust gas passage for the secondary air heater AH2 side which occupies a large portion as compared with the flow loss in the exhaust gas passage for the primary air heater AH1 side.

It should be noted here that the reason why the primary gas damper 17 is not maintained fully opened but is so controlled as to have an opening of 80% is for a purpose to permit some allowance of control. The predetermined value used in the subtractor 22 for control of the opening of the primary gas damper 17 may preferably be determined as a function of the flow rate of coal (x).

Further, in the embodiment of FIG. 2, the control system B for the primary air dampers controls the openings of the air dampers 6, 7 by feeding back the output of the air temperature sensor 12 detected at the outlet of the mill 8. However, this control may of course be also performed by feeding back the output of a within-mill air temperature sensor (not shown).

Further, in the embodiment of FIG. 2, the mill outlet temperature or mill interior temperature is maintained constant by controlling the gas dampers in response to fed back signal of the air temperature. However, the same effect can be obtained also when the gas damper is controlled in an open loop control as mentioned below.

Figure 5:
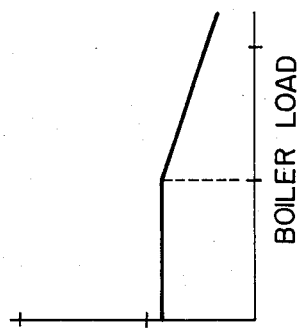
FIG. 5 is a graphical illustration of a relationship between an input/output characteristic of a function generator of FIG. 4.
Figure 4:
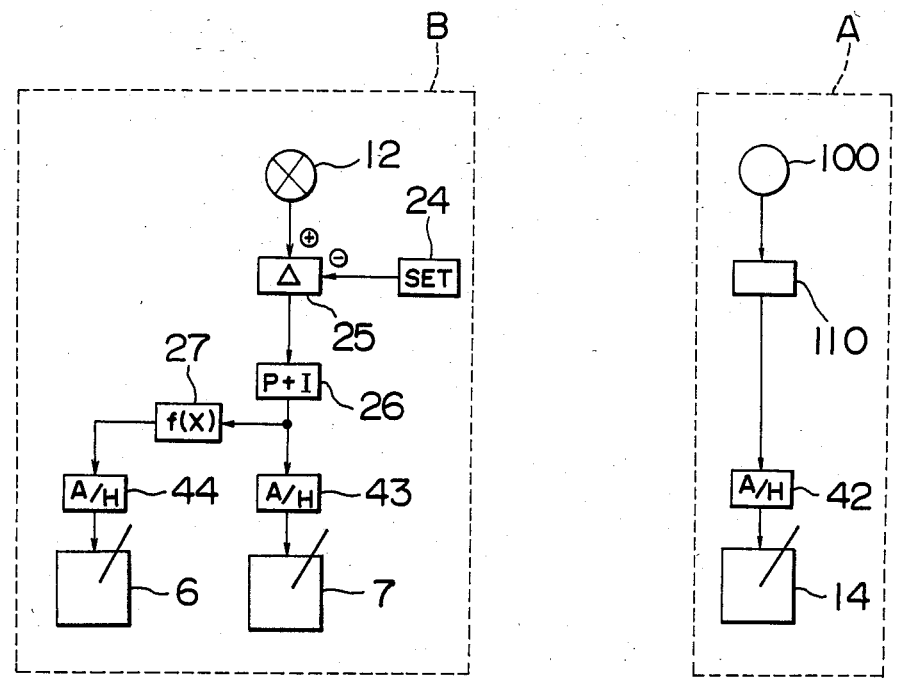
FIG. 4 is a schematic view of another embodiment of the present invention.

FIG. In 4 the air damper control system B is constructed in the same manner as in FIG. 2, that is to say, the air dampers 6, 7 are so controlled so as to cause the outlet temperature of the mill to be kept constant. In a gas damper control system A, the reference numeral 100 denotes a load signal source or main steam flow rate demand signal source, or a source of a combustion air flow rate command signal which is deduced from these signals, with the reference numeral 110 denoting a function generator in which a control signal for the opening of the gas damper for controlling the flow rate of the exhaust gas at the outlet of the secondary air heater is generated in accordance with the load signal or main steam flow rate demand signal (or combustion air flow rate command signal), and reference numeral 42 denoting an auto-manual selector. A gas damper 14 controls the flow rate of the exhaust gas at the outlet of the secondary air heater. FIG. 5 shows by way of example a relationship between a load (main steam flow rate) and opening characteristic of said gas-damper opening signal generated in the function generator 110 of FIG. 4. The gas-damper opening signal generated in the function generator 110 is allowed to pass through the auto side of the auto-manual selector 42 to control the gas damper 14 to correspondingly to the load or main steam flow rate (or combustion air flow rate). As a result, when the load is increased, the flow rate of the exhaust gas to be supplied into the primary air heater 1 is controlled with the rate of heat exchange therein also increased. This compensates for a decrease in the outlet air temperature of the mill, whereby the outlet temperature of the mill is maintained constant at a specified value.

As have been above described, according to the invention, since the within-mill air temperature is controlled by controlling the flow rate of the exhaust gas through the air heaters, air heater is not required to be large in size, and yet can keep high rate of heat exchange.

What is claimed is:

1. A method of controlling an air heater of a pulverized coal-fired boiler system comprising a boiler supplied with a secondary air for combusting the pulverized coal and a primary air for conveying the pulverized coal, a secondary air heater for preparing said secondary air by a heat exchange between fresh air and an exhaust gas of the boiler, a primary air heater for preparing a hot air by a heat exchange between the fresh air and an exhaust gas of the boiler, gas dampers for controlling the flow rate of said exhaust gases introduced into said secondary air heater and said primary air heater, respectively, a hot air damper means for controlling the flow rate of hot air prepared in said primary air heater, a cold air damper for controlling the flow rate of the fresh air bypassing said primary air heater, a coal mill means for pulverizing the coal and for conveying the pulverized coal to said boiler, by the primary air obtained by mixing said hot from said primary air heater with bypassing cold air, a first control means for adjusting the temperature in the coal mill by controlling an opening of said hot air damper and cold air damper in such a manner that one of the dampers is opened when the other one is closed, a second control means for generating a control signal effective to maintain the opening of the cold air damper approximately fully closed, and a third control means for controlling the openings of said dampers based on the control signals from said second control means, characterized in that the method comprises the steps of selecting said control signal from said second control means as a target signal and the air temperature at the outlet of the primary air heater as a feedback signal, and controlling the opening of said gas damper for said secondary air heater so as to maintain the opening of said gas damper for said primary air heater approximately fully opened.

2. A method of controlling an air heater of a coal-fired boiler system comprising a boiler, an air heater for obtaining a hot air through a heat exchange between an exhaust gas of said boiler and an atmospheric air, a mixing means for mixing a cold air with said hot air from said air heater, and a mill for pulverizing the coal and conveying the pulverized coal into said boiler by introducing the mixed air from said mixing means, controlling the mixing ratio between said cold air and said hot air in said mixing means is controlled in accordance with the air temperature at an outlet of said mill; and the flow rate of said exhaust gas in said air heater is controlled in accordance with said mixing ratio.

3. A method according to claim 2, wherein said mixing means is constituted by a hot air damper and a cold air damper, each of which can control the flow rate of the air therethrough.

4. A method of controlling an air heater of a coal-fired boiler system comprising a boiler, an air heater for obtaining a hot air through a heat exchange between an exhaust gas of said boiler and an atmospheric air, a mixing means for mixing a cold air constituted by said atmospheric air with said hot air from said air heater, and a mill for pulverizing the coal and conveying the pulverized coal into said boiler by introducing the mixed air, controlling the mixing ratio between said cold air and said hot air in said mixing means is controlled in accordance with the air temperature at an outlet of said mill; and the flow rate of said exhaust gas in said air heater is controlled in accordance with a load of said boiler.

5. A method according to claim 4, wherein said mixing means is constituted by a hot air damper and a cold air damper, each of which can control the flow rate of the air therethrough.

6. A method of controlling an air heater of a coal-fired boiler system comprising an air heater for heating a primary air used to dry a coal and convey it into a boiler of the coal-fired boiler and a secondary air used to combust said coal by a heat exchange between said primary and secondary air and the exhaust gas discharged from said boiler, said air heater including a primary air heater and a secondary air heater arranged in parallel into which the exhaust gas is introduced from said boiler by an induced draft fan, the flow rate of said exhaust gas introduced into each of said air heaters being controlled by a respective gas damper, and said heated primary air being mixed with a cold air to obtain a suitable air temperature to dry and convey said coal, controlling the opening of the damper for introducing said cold air is kept at a low value of approximate 0%, thereby said suitable temperature being obtained by controlling said gas damper for said primary air heater.

7. A method according to claim 6, wherein control of said primary air heater is made by controlling the opening of said gas damper for said secondary air heater so as to keep said gas damper for said primary air heater at an opening approximate to 100%.

8. An apparatus for controlling air heaters of a pulverized coal fired boiler system, the apparatus comprising a boiler supplied with a secondary air for combusting the pulverized coal and a primary air for conveying the pulverized coal, a second air heater means for preparing said secondary air by a heat exchange between a fresh air and an exhaust gas of the boiler, a primary air heater means for preparing a hot air by a heat exchange between a fresh air and an exhaust gas of the boiler, gas damper means for controlling the flow rate of said exhaust gases introduced into said secondary air heater means and said primary air heater means, respectively, a hot air damper means for controlling the flow rate of hot air prepared in said primary air heater means, a cold air damper means for controlling the flow rate of fresh air bypassing said primary air heater means, a coal mill means for pulverizing the coal and for conveying the pulverized coal to said boiler by the primary air obtained by mixing said hot air from said primary air heater means with bypass cold air, a first control means for adjusting the temperature in the coal mill means by controlling the openings of said hot air damper means and said cold air damper means in such a manner that one of said damper means is opened when the other of said damper means is closed, a second control means for generating a control signal effective to maintain the opening of the cold air damper means approximately fully closed, a third control means for controlling the openings of said damper means based on said control signal from said second control means, said third control means controlling an opening of said gas damper means for said secondary air heater means by selecting said control signal from said second control means as a target signal and the air temperature at the outlet of the primary air heater means as a feedback signal, so as to maintain the opening of said gas damper means for said primary air heater means approximately fully opened.

* * * * *